United States Patent [19]

Robinson, Jr.

[11] 4,182,409

[45] Jan. 8, 1980

[54] HEAT TRANSFER SYSTEM

[76] Inventor: Glen P. Robinson, Jr., 1050 Mt. Paran Rd., NW., Atlanta, Ga. 30327

[21] Appl. No.: 882,655

[22] Filed: Mar. 2, 1978

Related U.S. Application Data

[62] Division of Ser. No. 615,343, Sep. 22, 1975, Pat. No. 4,119,143.

[51] Int. Cl.$^2$ ............................................. F28D 21/00
[52] U.S. Cl. ................... 165/104 S; 165/105; 126/400; 126/271
[58] Field of Search .................. 165/104 S, 105, 18; 126/271, 400

[56] References Cited

U.S. PATENT DOCUMENTS

| | | | |
|---|---|---|---|
| 2,153,942 | 4/1939 | Spalding, Jr. | 165/105 X |
| 3,804,154 | 4/1974 | Asdell et al. | 165/105 X |
| 3,893,506 | 7/1975 | Laing | 165/105 X |

Primary Examiner—Albert W. Davis, Jr.
Attorney, Agent, or Firm—B. J. Powell

[57] ABSTRACT

A heat storage and/or recovery system using multiple heat storage tanks to selectively store heat from a solar collector and recover the stored heat to operate a heat driven system. The heat from the solar collector is transferred into the storage tanks through an input heat transfer link configuration using vapor heat transfer which automatically transfers heat into a storage tank that will accept the heat but effectively prevents the flow of heat from the storage tanks back to the solar collector while the heat in the storage tanks is transferred to the heat driven system through a recovery heat transfer link configuration also using vapor heat transfer which automatically transfers heat to the heat driven system from a storage tank capable of supplying heat but effectively prevents the flow of heat from the heat driven system back into the storage tanks.

7 Claims, 5 Drawing Figures

HEAT TRANSFER SYSTEM

CROSS REFERENCE TO RELATED APPLICATION

This application is a division of my co-pending application Ser. No. 615,343 filed Sept. 22, 1975, now U.S. Pat. No. 4,119,143, granted Oct. 10, 1978.

BACKGROUND OF THE INVENTION

As the resources of combustible fuels to supply energy for heating, cooling and electricity are becoming more depleted, considerable interest has been generated in the use of solar energy to satisfy these requirements. The ability of a solar powered system to effectively utilize solar energy in a reliable and economical manner depends in large part on (1) its ability to efficiently store large quantities of heat during the limited number of hours of available sunlight in order to operate the system during the time in which sunlight is not available; and (2) its ability to efficiently store heat at the highest possible temperature over a relatively wide range of collection temperatures during the available hours of sunlight.

Because water has proved to be one of the most economical storage mediums available from the present state of the art, most prior art solar energy storage systems use water as the storage medium. Since the amount of heat that can be stored in a fixed quantity of water is directly proportional to its temperature, it is desirable to have the water at the highest temperature possible in order to keep the quantity of water required for storage at a minimum. On the other hand, because a single hot water storage tank can absorb heat only when the temperature from the solar collector is higher than the temperature of the water in the storage tank and because the available temperature at the solar collector varies significantly over the normal hours of available sunlight, it is desirable to use multiple storage tanks which permit shifting the heat storage to another tank when one of the tanks will not absorb any more heat from the solar collector.

Multiple water storage tank systems have been proposed where the solar collector is connected to the appropriate storage tank through temperature controlled mechanical valves. These systems require that both the temperature of the heat output from the solar collector and the temperatures of the water in the tanks be sensed, and that an appropriate control system be provided so that the mechanical valves can be sequenced to transfer the solar collector heat output from one storage tank as its temperature approaches that of the output from the solar collector to another storage tank which will accept the heat output. This has necessarily required these systems to be complex and thus expensive to build and operate. Similar systems have been proposed which provide for the recovery of usable heat from these storage tanks, however, such heat recovery systems have suffered from the same drawbacks as the prior art storage systems.

SUMMARY OF THE INVENTION

These and other problems and disadvantages associated with the prior art are overcome by the invention disclosed herein by providing a heat transfer link that connects the heat output from a heat source such as a solar collector to a heat sink capable of receiving heat such as a heat storage tank which allows rapid transfer of large quantities of heat from the heat output of the solar collector to the heat storage tank as long as the heat output from the solar collector is slightly higher than the temperature of the heat storage tank but substantially prevents the flow of heat from the storage tank back into the solar collector when the temperature of the storage tank is substantially equal or higher than the temperature of the solar collector. The heat transfer link acts as a heat check valve to allow the heat from the heat source to flow into the heat sink but prevents the reverse flow of heat from the heat sink back into the heat source. Various combinations of these heat transfer links can be used to provide a multiple storage tank system with the capability of storing heat at different temperatures without the use of temperature sensors, mechanical valves or control systems.

A similar heat transfer link can be used to provide a heat recovery system from the heat storage tanks. By using various combinations of these heat transfer links, a heat recovery system for recovering heat from multiple heat storage tanks at different temperatures can be provided without the use of temperature sensors, mechanical valves or control systems.

The heat transfer link of the invention is adapted to transfer heat from a source of heat to a heat sink while substantially preventing the transfer of heat from the heat sink back to the source of heat. The heat transfer link includes a first heat exchange means carrying a working fluid with a prescribed vaporization temperature and pressure range where the first heat exchange means is located at a first elevation and places the working fluid therein in a heat exchange relationship with the heat output of the source of heat to vaporize the working fluid. The heat transfer link also includes a second heat exchange means located at a second elevation higher than the first elevation and connected to the first heat exchange means for receiving the vaporized working fluid from the first heat exchange means and returning condensed working fluid to the first heat exchange means under the force of gravity. The second heat exchange means places the vaporized working fluid in a heat exchange relationship with the heat sink so that the heat sink will absorb the heat from the vaporized working fluid to condense it as long as the temperature of the heat sink is below the temperature of the source of heat. As the vaporized working fluid condenses, the condensed working fluid flows back to the first heat exchanger means under the force of gravity to be re-vaporized.

For a heat storage system, the source of heat may be the heat output of the solar collector and the heat sink may be a plurality of storage tanks, usually filled with water. For a heat recovery system, the source of heat is usually the plurality of storage tanks, usually filled with water, while the heat sink is usually a heating system, a heat driven cooling system or some other heat driven system.

For a heat storage system, if the heated output from the heat source is serially through multiple heat transfer links individually connected to multiple heat storage tanks, then the first most upstream tank will be heated first followed successively by the downstream tanks. If a single heat transfer link is used with series connected output heat exchanges individually associated with multiple heat storage tanks, substantially the same result can be achieved.

For a heat recovery system using multiple heat storage tanks, if the operating fluid of the heat sink is passed serially through multiple heat transfer links individually connected to the storage tanks so that the lowest temperature tank is the most upstream, then the highest temperature can be maintained in the operating fluid for the longest period of time. If a single heat transfer link is used with series connected input heat exchangers individually associated with multiple heat storage tanks, the heat may be sequentially recovered from the storage tanks starting with either the highest or lowest temperature tank first.

These and other features and advantages of the invention will become more apparent upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
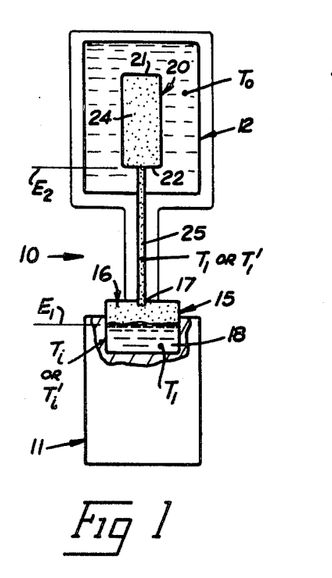
FIG. 1 is a schematic drawing illustrating one of the heat transfer links of the invention.

Referring to FIG. 1, the heat transfer link 10 is connected between a heat source 11 and a heat sink 12 and is in a heat exchange relationship with both. The heat transfer link 10 operates to transfer heat from the heat source 11 to the heat sink 12 but prevents the transfer of heat from the heat sink 12 back to the heat source 11. Thus, the heat transfer link 10 is a one direction heat transfer device as will become more apparent.

The heat transfer link 10 comprises an input heat exchanger 15 including a fluid reservoir 16 with an upper end 17. The fluid reservoir 16 is charged with a working fluid 18 which has a prescribed vaporization temperature and pressure relationship so that the liquid level of the working fluid has elevation $E_1$. While a number of different working fluids may be used as long as the working fluid can be vaporized at the minimum operating temperature of the heat source 11, refrigerants normally used in air conditioning systems such as Refrigerant 12 have been found satisfactory when heat is being received from a solar collector, especially where the heat source working fluid is water and the heat sink working fluid is water. The input heat exchanger 15 places the working fluid 18 in a heat exchanger relationship with the heat output of the heat source 11 so that the working fluid in reservoir 16 will be vaporized when the temperature of the heat output from the heat source 11 exceeds the vaporization temperature of the working fluid as will become more apparent.

The heat transfer link 10 also includes an output heat exchanger 20 which has an upper end 21 and a lower end 22. The output heat exchanger 20 defines a heat transfer chamber 24 therein which receives the vaporized working fluid 18 therein and places this vaporized working fluid in a heat exchange relationship with the heat sink 12. The lower end 22 of the output heat exchanger 20 is located at a second elevation $E_2$ higher than the first elevation and the lower end 22 of the heat transfer chamber 24 in output heat exchanger 20 is connected through transfer pipe 25 to the upper end 17 of the fluid reservoir 16 in input heat exchanger 15. The upper end 21 of the heat transfer chamber 24 in output heat exchanger 20 is closed. The fluid chamber 16, the pipe 25, and the heat transfer chamber 24 define a closed system and this system is charged with working fluid 18 so that pipe 25 and chamber 24 are filled with vaporized working fluid when no heat is being transferred from input heat exchanger 15 to output heat exchanger 20.

In operation, the fluid chamber 16, the pipe 25 and the heat transfer chamber 24 are charged with the working fluid 18 at a prescribed pressure when the temperature of the working fluid is at a known temperature. The initial charging pressure is selected to cause the working fluid 18 in the input heat exchanger 15 to start boiling to vaporize the liquid working fluid when the available temperature from the heat source 11 rises above a prescribed value to start the operation of the heat transfer link 10.

Assuming initially that the temperature $T_i$ of the heat source 11 is the same as the temperature $T_o$ of the heat sink 12, the working fluid 18 in a liquid state will partly fill the reservoir 16 in the input heat exchanger 15. The rest of reservoir 16, the pipe 25 and the heat transfer chamber 24 will be filled with the working fluid 18 in a vapor state. The temperature $T_l$ and pressure $P_l$ of the liquid and vapor of the working fluid 18 will be substantially constant throughout both heat exchangers 15 and 20 and the pipe 25. The temperature $T_l$ will be equal to temperatures $T_i$ and $T_o$ and the vapor phase of working fluid 18 will be in equilibrium with the liquid phase thereof. Because there are no temperature differences between the heat source 11 and heat sink 12, no heat will be transferred and the system will be at a steady state. When the output temperature $T_i$ of the heat source 11 rises to temperature $T_i'$ above the temperature $T_o$ of the heat sink 12, the working fluid 18 in its liquid phase will start to boil. This causes the working fluid 18 to absorb heat and increase its enthalpy. Thus, the heat source 11 is now trying to drive the temperature $T_l$ of the working fluid 18 toward the higher temperature $T_i'$ of the heat source 11 by vaporizing liquid working fluid while the heat sink 12 is trying to drive the temperature $T_l$ toward the lower temperature $T_o$ of the heat sink 12 by condensing vapor working fluid. This generates a slight pressure difference in the vapor working fluid 18 between exchanger 15 and exchanger 20 so that a net vapor flow is generated between the exchangers 15 and 20 driving the vapor and thus the heat energy toward exchanger 20. The temperature of the working fluid 18 will rise to a higher temperature $T_l'$ with a corresponding rise in pressure to pressure $P_l'$ where the liquid and vapor phases again reach equilibrium but the pressure and temperature will still be virtually constant throughout the system.

The temperature $T_o$ of the heat sink 12 is now below the temperature $T_i'$ of the working fluid vapor in the output heat exchanger 20 so that the latent heat in working fluid 18 is transferred to the heat sink 12 to decrease the enthalpy of the working fluid vapor causing it to start to condense to its liquid phase. Because the liquid working fluid 18 in the output heat exchanger 20 is at substantially the same temperature $T_i'$ as the vaporized working fluid 18, virtually no heat transfer takes place between the liquid and vapor as the condensed liquid working fluid 18 flows back by gravity to the input heat exchanger 15 through pipe 25. As the vapor in the output heat exchanger 20 is condensed, more of the liquid in the input heat exchanger 15 is vaporized to replace the condensed vapor. Thus, it will be seen that heat will be continuously transferred from the output of the heat source 11 to the working fluid 18 through the input heat exchanger 15 while heat will be continuously transferred from the working fluid 18 to the heat sink 12 through the output heat exchanger 20 as long as the actual temperature $T_o^a$ of the heat sink 12 remains below the temperature $T_i'$ of the output of the heat source 11. The heat transfer rate from the heat source 11 to the heat sink 12 through the heat transfer link 10 is, of course, proportional to the temperature difference between the heat source 11 and heat sink 12 with greater temperature differences producing greater heat transfer rates. Because the latent heat of the working fluid 18 is used as the heat transfer mechanism, the heat transfer rate capability of link 10 is several times greater than a heat transfer mechanism that does not use vaporization and condensation.

Figure 2:
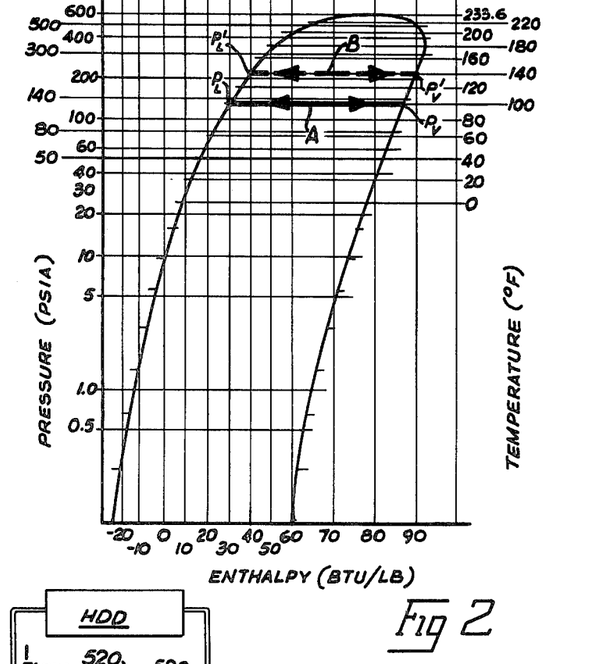
FIG. 2 is a saturated pressure-enthalpy curve for a typical refrigerant.

Reference to FIG. 2, which is a saturation pressure-enthalpy curve for a typical refrigerant such as Refrigerant 12 (Freon-12, a trademark of DuPont de Nemours Co.), will better explain the pressure and temperature relationships of the heat transfer. Because the working fluid 18 changes from its liquid to its vapor phase and back to its liquid phase at a substantially constant pressure and temperature under saturation conditions, it will be seen that heat is transferred while the working fluid 18 remains at a substantially constant temperature. For instance, assume that heat is being transferred into the heat transfer link from the heat source and the equilibrium temperature of the working fluid in the link is 100° F. The heat being transferred into and out of the link working fluid is represented by the solid line A in FIG. 2 extending between point $P_L$ on the saturated liquid side of the curve and $P_v$ on the saturated vapor side of the curve. Now, suppose the temperature of the heat source imposed on the heat transfer link is increased. This raises the equilibrium temperature of the working fluid in the link to 140° F. as an example. The heat being transferred into and out of the link working fluid is now represented by dashed line B extending between point $P_L'$ on the saturated liquid side of the curve and point $P_v'$ on the saturated vapor side of the curve. As the temperature of the heat source rises, it will be seen that both the pressure and temperature of the working fluid 18 rise, however, the higher pressure and temperature are substantially constant throughout the working fluid 18.

When the temperature $T_o$ of the heat sink 12 equals the temperature $T_i$ of the heat source 11 or the temperature $T_i$ of the heat source 11 falls below the temperature $T_o$ of the heat sink 12 as would occur with a solar collector heat source over a period of daily operation, the liquid working fluid 18 in the input heat exchanger 15 would no longer be vaporized since the pressure of the vapor working fluid 18 would be equal to or greater than the equilibrium vapor pressure of the liquid working fluid 18 in the input heat exchanger 15. All of the condensed liquid working fluid 18 will now drain back into the input heat exchanger 15 and not vaporize. When the temperature $T_i$ reduces to a value less than temperature $T_o$, some of the vapor working fluid 18 will condense until a new lower equilibrium pressure is reached. However, since there is now no liquid working fluid 18 in the output heat exchanger 20, the higher temperature $T_o$ in the heat sink 12 can produce no vapor in the working fluid 18 and there will consequently be no heat transferred through the working fluid 18 in the reverse direction from the heat sink 12 to the heat source 11 except for a small amount of heat flow caused by conduction through pipe 25 and by convection through the vapor working fluid 18 in pipe 25. Thus, the heat transfer link 10 effectively transfers heat only from the heat source 11 to the heat sink 12 and not in the reverse direction.

FIRST EMBODIMENT OF HEAT STORAGE AND RECOVERY SYSTEM

Figure 3:
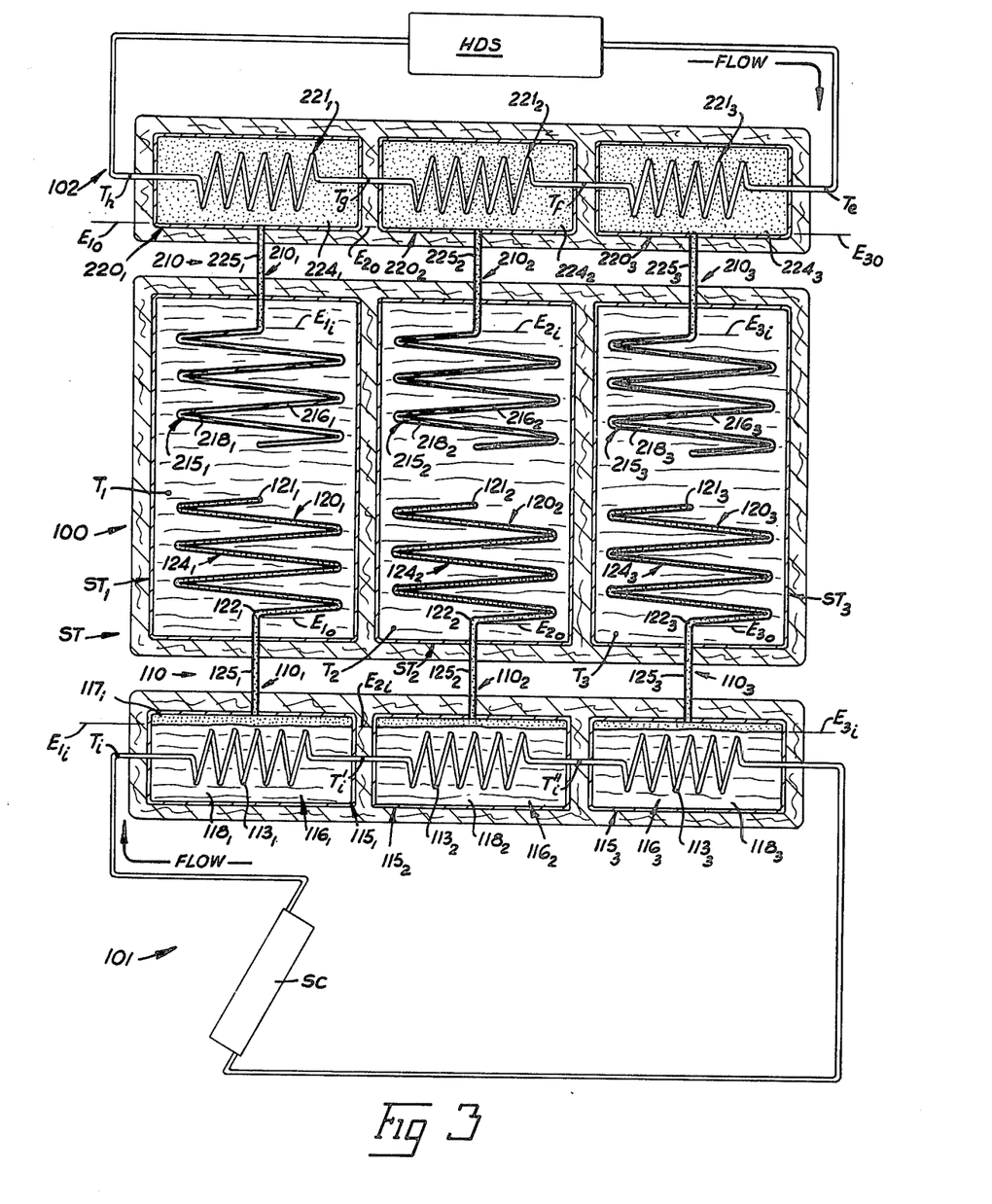
FIG. 3 is a schematic drawing illustrating one embodiment of a heat storage and recovery system of the invention.

FIG. 3 illustrates a heat storage and recovery system 100 which uses a plurality of heat transfer links to store and recover heat at different temperature levels. This system is especially adaptable to store heat from a solar collector SC that acts as the heat source for the storage loop 101 of the system. The solar collector SC has a heated fluid output, usually water, whose heat is transferred to a plurality of insulated storage tanks ST with a storage fluid therein, usually water. These storage tanks ST act as the heat source in the heat recovery loop 102 of the system. The heat in the storage tanks ST is transferred to a heat driven system HDS such as a heater or heat driven air conditioner to drive the system. While different numbers of storage tanks ST may be used, three are illustrated and individually designated $ST_1$, $ST_2$ and $ST_3$.

The system heat input loop 101 includes a separate storage heat transfer link 110 transferring heat from the output fluid of the solar collector SC to one of the storage tanks ST. The heat transfer links are individually numbered $110_1$, $110_2$ and $110_3$ to correspond to the storage tank into which each transfers heat from the solar collector. Since each of the storage heat transfer links 110 have the same construction, only link $110_1$ will be described in detail with corresponding reference numbers being applied to links $110_2$ and $110_3$.

The input heat exchanger $115_1$ of link $110_1$ is a shell and tube type heat exchanger where the working fluid $118_1$ of the link is carried in the shell chamber $116_1$ while the heated fluid output from the solar collector SC passes through the tubes $113_1$ of exchanger $115_1$ to heat the working fluid $118_1$. The output heat exchanger $120_1$ is a coil vertically oriented and immersed in the storage fluid in tank $ST_1$. The passage $124_1$ in coil $120_1$ is closed at its upper end $121_1$ while its lower end $122_1$ is connected to the vapor space in the shell of heat exchanger $115_1$ through the transfer pipe $125_1$. It will thus be seen that the link $110_1$ will transfer heat from the heated fluid output from the solar collector SC passing through tube $113_1$ to the storage fluid in tank $ST_1$ in the manner described for link 10 but will not transfer significant heat in the reverse direction from the storage fluid in the storage tank to the fluid output from the solar collector. The level of the liquid working fluid in the shell chamber $116_1$ is at the lower elevation $E_{1i}$ while the lower end $122_1$ of coil 120 is located at the higher elevation $E_{1o}$ so that the working fluid $118_1$ condensed in coil $120_1$ will flow back to the shell chamber $116_1$ in exchanger $115_1$ through pipe $125_1$ under the influence of gravity. Normally, the pipe $125_1$ will be insulated.

It will be noted that the heated fluid output from the solar collector SC passes serially through the tubes $113_1$, $113_2$ and $113_3$ of the heat exchangers $115_1$, $115_2$ and $115_3$ of the heat transfer links $110_1$, $110_2$ and $110_3$. Thus, the heated fluid output from solar collector SC passes through the tube $113_1$ in link $110_1$ first, then through tube $113_2$ in link $110_2$, and finally through the tube $113_3$ in link $110_3$ before it is recycled through the solar collector SC for reheating.

The system heat input loop 101 of the system 100 operates with the transfer links $110_1$-$110_3$ each transferring heat to its associated storage tank under the theory of operation described hereinabove for link 10. Assuming that the storage tank $ST_1$ is at an initial temperature $T_1$, that the storage tank $ST_2$ is at an initial temperature $T_2$ and that the storage tank $ST_3$ is at an initial temperature $T_3$, the system operation will be described where the input temperature $T_i$ from the solar collector heat source SC is at a higher temperature of any of the tanks ST. The heated fluid output from the solar collector SC passes first through the tube $113_1$ in the input heat exchanger $115_1$ of the first heat transfer link $110_1$ where the working fluid $118_1$ in the heat transfer link $110_1$ is vaporized thereby absorbing heat and transfering heat from the heated fluid output of collector SC to the storage tank $ST_1$. This causes the heated fluid output from the solar collector SC to be cooled to a new lower temperature $T_i'$ by the time it passes to the next heat transfer link $110_2$. If this new temperature $T_i'$ is higher than the temperature $T_2$ of the storage tank $ST_2$, then heat will also be transferred through the heat transfer link $110_2$ to cool the heated fluid output from the colar collector SC to a still lower temperature $T_i''$ by the time it passes to the third heat transfer link $110_3$. If the temperature $T_i''$ is higher than the temperature $T_3$ in the storage tank $ST_3$, then additional heat will be transferred into the storage tank $ST_3$ before the fluid output from the colar collector SC finally is recycled back through the solar collector SC to be reheated. The rate of heat transferred into each tank $ST_1$-$ST_3$ is, of course, proportional to the temperature difference between the temperature of the fluid in the tank and the temperature of the fluid output from the solar collector while it is passing through the particular heat transfer link associated with the tank. Thus, it will be seen that the temperature $T_1$ in the tank $ST_1$ will be driven toward the output temperature $T_i$ from the solar collector with the temperatures of each of the subsequent tanks $ST_2$ and $ST_3$ being at lower temperatures. As the temperature $T_1$ of tank $ST_1$ is driven toward the temperature $T_i$, more and more of the heat transferred out of the heat source output fluid will shift to the next downstream storage tank since the heat transferred is proportional to the temperature differences. If the temperature $T_1$ reaches the temperature $T_i$, then the fluid output from the solar collector SC will pass through link $110_1$ without heat transfer because of the one way action of link $110_1$ and the heat will be transferred into the next downstream tank which is at a temperature lower than the temperature of the fluid output from the solar collector.

Because the available solar heat at any given location varies during the hours of daily sunlight, the output temperature $T_i$ from the solar collector SC may drop below the temperature $T_1$ in the storage tank $ST_1$ while the temperature will still remain higher than the temperature $T_2$ or $T_3$ in tanks $ST_2$ or $ST_3$. Because of the one way action of each of the heat transfer links 110, the heated fluid output from the solar collector SC will pass through those heat transfer links associated with the storage tanks ST at a temperature higher than the temperature $T_i$ without transferring heat to the particular storage tank. As soon as this heated fluid output reaches the heat transfer link 110 associated with the upstreammost storage tank ST at a lower temperature than the temperature $T_i$, heat will be transferred through the heat transfer link 110 into that storage tank ST until the temperature of the storage fluid in that particular storage tank rises to or exceeds the temperature $T_i$. Normally the temperature $T_1$ will be greater than the temperature $T_2$ and the temperature $T_2$ will be greater than the temperature $T_3$. If the temperature $T_i$ falls below all of the temperatures at the storage tanks, the fluid output from the solar collector will flow through all of the input heat exchangers 115 without heat being transferred to any of the associated storage tanks ST. When the input temperature $T_i$ again rises above any of the temperatures of the storage fluids in the storage tanks, heat will be transferred through the associated link 110 into the storage fluid in the most upstream storage tank whose temperature is below the temperature $T_i$.

The heat recovery loop 102 includes a separate recovery heat transfer link 210 connecting each storage tank with the driving fluid of a heat driven system HDS. The recovery heat transfer links 210 are individually numbered $210_1$, $210_2$ and $210_3$ to correspond to the storage tank each connects to the driving fluid of the heat driven system HDS. Since each of the recovery heat transfer links 210 have the same construction, only link $210_1$ will be described in detail with corresponding reference numbers being applied to links $210_2$ and $210_3$.

The input heat exchanger $215_1$ of link $210_1$ is a coil vertically oriented and immersed in the storage fluid in tank $ST_1$. The working fluid $218_1$ of the link is carried in the coil passage $216_1$ which is closed at its lower end while its upper end is connected to the output heat exchanger $220_1$ through the transfer pipe $225_1$. The output heat exchanger $220_1$ is a shell and tube type heat exchanger where the vaporized working fluid $218_1$ is received in the shell chamber $224_1$ while the heat driven system driving fluid to be heated passes through the tube $221_1$ of the exchanger $220_1$. It will further be noted that the upper end of the input heat exchanger $215_1$ is located at a first elevation $E_{1i}$ while the lowermost portion of the shell chamber $224_1$ is located at a higher elevation $E_{1o}$. It will further be noted that the liquid level of the working fluid $218_1$ substantially fills the coil passage $216_1$ under equilibrium conditions. It will thus be seen that the link $210_1$ will transfer heat from the storage liquid in tank $ST_1$ to the heat driven system driving fluid passing through the tube $221_1$ in the output heat exchanger $220_1$ in the manner described for the link 10 but will not transfer significant heat in the reverse direction from the heat driven system driving fluid passing through heat exchanger $220_1$ to the storage fluid in the storage tank $ST_1$. In essence, it will be seen that the links 210 are simply the links 110 turned upside down. Thus, the input heat exchangers 215 will vaporize the working fluids 210 and the shell and tube type heat exchangers 220 will condense the working fluids 218.

It will further be noted that the driving fluid to be heated passes serially through the heat transfer links $210_1$, $210_2$ and $210_3$. Depending on the size of the heat exchangers 215, the driving fluid to be heated will tend to be heated to the highest temperature available from the storage tanks ST. If the driving fluid to be heated is passed serially through the recovery heat transfer links 210 as seen in FIG. 3 so that the driving fluid passes first through the output heat exchanger $220_3$ of the heat transfer link $210_3$, and assuming that the temperature $T_3$ is less than the temperature $T_2$ and the temperature $T_2$ is less than the temperature $T_1$, then heat will be transferred from each of the storage tanks ST but the temperature of all of the tanks ST will be lowered at the same time. Assuming that the inlet temperature of the driving fluid is at $T_e$ seen in FIG. 3, then the storage heat transfer link $210_3$ will transfer heat from the storage tank $ST_3$ into the driving fluid to raise the temperature of the driving fluid to the temperature $T_f$ by the time it passes through the link $210_3$. If the temperature $T_2$ in tank $ST_2$ is higher than the temperature $T_f$, then additional heat will be transferred from the storage tank $ST_2$ into the driving fluid as it passes through the output heat exchanger 220 of the link $210_2$. This serves to raise the temperature of the driving fluid to a still higher temperature $T_g$ by the time it passes through the link $210_2$, and, if the temperature $T_1$ is higher than the temperature $T_g$, then the heat transfer link $210_1$ will transfer additional heat into the driving fluid as it passes through the link $210_1$ to raise its temperature to a higher temperature $T_h$. This output temperature $T_h$ of the driving fluid will approach that of the highest temperature stored or temperature $T_1$. On the other hand, if the flow of the heat driven system driving fluid through the heat transfer links 210 is reversed so that the driving fluid flows first through the heat transfer link $210_1$ associated with the highest temperature $T_1$ in the storage tanks ST, and the effective heat transfer surface area of the heat exchanger $215_1$ of the link $210_1$ is sufficiently large, then the driving fluid will be heated to a temperature approaching the temperature $T_1$ before it exits the heat exchanger $215_1$. If the temperature $T_1$ is greater than the temperature $T_2$ and the temperature $T_3$, then the temperature of the driving fluid as it exits the link $210_1$ will be higher than the temperatures $T_2$ and $T_3$ so that substantially no heat will be transferred from the storage tanks $ST_2$ and $ST_3$ until the temperature $T_1$ drops to the vicinity of the temperature $T_2$ or $T_3$ whereupon the heat transfer links $210_2$ and/or $210_3$ will start to transfer heat into the driving fluid. If any one of the temperatures $T_1$, $T_2$ or $T_3$ drops below the initial temperature of the heat driven system driving fluid passing through its associated heat transfer link 210, then no heat will be removed from the associated lower temperature storage tank ST.

The recovery loop 102 is well suited to heat recovery where it is desirable to recover heat at the highest possible temperature for the longest period of time. A number of applications would use this approach such as, for example, where the heat driven system uses an absorption refrigeration cycle which requires temperatures greater than about 180° F.

SECOND EMBODIMENT OF HEAT STORAGE AND RECOVERY SYSTEM

Figure 4:
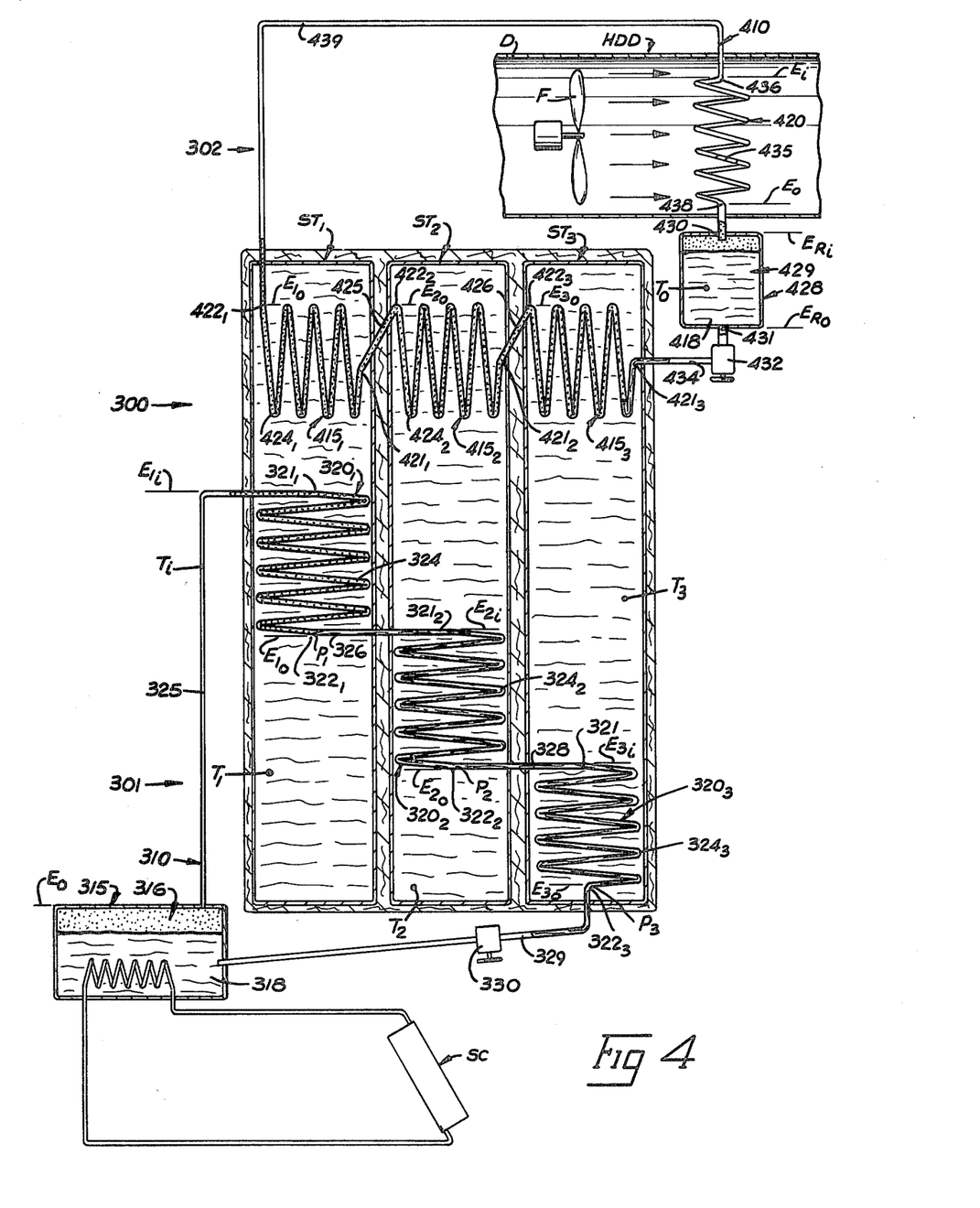
FIG. 4 is a schematic drawing illustrating another embodiment of a heat storage and recovery system of the invention; and, FIG. 5 is a schematic drawing illustrating still another heat recovery system of the invention.

FIG. 4 illustrates another heat storage and recovery system 300 which uses a modified heat transfer link construction to store and recover heat at different temperature levels. This system, like system 100, is especially adaptable to store heat from a solar collector SC that acts as the heat source for the heat input loop 301 of the system. The solar collector SC has a heated fluid output, usually water, whose heat is transferred to a plurality of insulated storage tanks ST with a storage fluid therein, usually water. These storage tanks ST act as the heat source in the heat recovery loop 302 of the system. The heat in the storage tanks ST is transferred to a heat driven device HDD such as a heater or heat driven air conditioner to drive the device. While different numbers of storage tanks ST may be used, three are illustrated and individually designated $ST_1$, $ST_2$ and $ST_3$.

The heat from the heated fluid output of solar collector SC is transferred to the storage fluid in the storage tanks ST by a combination storage heat transfer link 310 whose theory of operation is based on that of link 10. The storage heat transfer link 310 has a single input heat exchanger 315 and a plurality of output heat exchangers 320 serially connected to the input heat exchanger 315. The heat exchanger 315 is a shell and tube type heat exchanger where the working fluid 318 of the link is carried in the shell chamber 316 while the heated fluid output from the solar collector SC passes through the tube 313 of exchanger 315 to heat the working fluid 318. The working fluid liquid level in the shell chamber 316 is at elevation $E_o$. Each of the output heat exchangers 320 is a coil vertically oriented and immersed in the storage fluid of one of the storage tanks ST. For sake of simplicity, the coils have been numbered $320_1$, $320_2$ and $320_3$ corresponding to the storage tank number in which they are submerged. Thus, it will be seen that coil $320_1$ defines a passage $324_1$ therein with an upper inlet end $321_1$ and a lower outlet end $322_1$. Likewise, coil $320_2$ has passage $324_2$, inlet end $321_2$ and outlet end $322_2$; and coil $320_3$ has passage $324_3$, inlet end $321_3$ and outlet end $322_3$. The upper inlet end $321_1$ of coil 320 is located in tank $ST_1$ at an elevation $E_{1i}$ higher than elevation $E_o$ and is connected to the vapor space in the shell chamber 316 in heat exchanger 315 through the transfer pipe 325. The lower outlet end $322_1$ of coil $320_1$ is located at elevation $E_{1o}$ which is lower than elevation $E_{1i}$ but higher than elevation $E_o$. The upper inlet end $321_2$ of coil $320_2$ in tank $ST_2$ is located at elevation $E_{2i}$ at least as low as elevation $E_{1o}$ but higher than elevation $E_o$ and is connected to the outlet end $322_1$ of coil $320_1$ through transfer pipe 326. The lower outlet end $322_2$ of coil $320_2$ is located at elevation $E_{2o}$ lower than elevation $E_{2i}$ but higher than elevation $E_o$. In like manner, the upper inlet end $321_3$ of coil $320_3$ in tank $ST_3$ is located at elevation $E_{3i}$ at least as low as elevation $E_{2o}$ but higher than elevation $E_o$ and is connected to the outlet end $322_2$ of coil $320_2$ by transfer pipe 328. The lower outlet end $322_3$ of coil $320_3$ is located at elevation $E_{3o}$ lower than elevation $E_{3i}$ but higher than elevation $E_o$ and is connected back to the shell chamber 316 in input heat exchanger 315 therein through return pipe 329 and metering valve 330. Thus, it will be seen that the vapor working fluid 318 can successively circulate through the coils $320_1$–$320_3$ while the working fluid 318 condensed in the coils $320_1$–$320_3$ drains back to the exchanger 315 through the succeeding coils and valve 330.

Assuming an initial temperature $T_1$ in tank $ST_1$, a temperature $T_2$ in tank $ST_2$ and a temperature $T_3$ in tank $ST_3$, a temperature $T_i$ in the heated fluid output of solar collector SC higher than temperatures $T_1$–$T_3$ will cause the liquid working fluid 318 in heat exchanger 315 to start vaporizing and absorbing heat as the solar collector fluid output passes through exchanger 315. This starts vapor working fluid 318 circulating out through pipe 325 and serially through coils $320_1$–$320_3$. As soon as the temperature of the vapor working fluid 318 in coil $320_1$ rises above temperature $T_1$, it starts to condense and drain back to exchanger 315 through coils $320_2$ and $320_3$ and valve 330. While the vapor working fluid 318 may initially condense in all three coils, the valve 330 which is an adjustable flow control valve is adjusted to control the flow of condensed liquid working fluid 318 back to exchanger 315 so that the liquid level of the working fluid 318 in coils $320_1$–$320_3$ will be maintained at the outlet end of the particular coil $320_1$–$320_3$ transferring heat into the storage tank associated therewith across some prescribed temperature difference between the working fluid 318 and the storage fluid receiving heat. Therefore, in this instance, an appropriate adjustment of valve 330 will cause the condensed liquid level of fluid 318 to rise to the level of the outlet end $322_1$ of coil $320_1$ as indicated at point $P_1$ in FIG. 4 when the system reaches steady state conditions. Because coils $320_2$ and $320_3$ are now filled with liquid working fluid 318, the heat transferred to tanks $ST_2$ and $ST_3$ will be small compared to the heat transferred to tank $ST_1$. When temperature $T_1$ substantially equals the temperature $T_i$ or temperature $T_i$ drops below temperature $T_1$, the vapor working fluid 318 will cease to be condensed in coil $320_1$ and the level of condensed working fluid 318 in coils $320_2$ and $320_3$ will start to lower since this condensed working fluid continues to drain back to heat exchanger 315 through valve 330. The level of the condensed liquid working fluid 318 lowers to a new position $P_2$ at coil $320_2$ so that coil $320_2$ now condenses the working fluid 318 to maintain the level of the condensed working fluid until the temperature $T_2$ substantially equals temperature $T_i$ or temperature $T_i$ drops below temperature $T_2$. The level of condensed working fluid then lowers to a new position $P_3$ where the vapor working fluid 318 is condensed in coil $320_3$. Normally, then, the temperature $T_1$ will be higher than temperature $T_2$ and temperature $T_2$ will be higher than temperature $T_3$. It will also be noted that the transition of the condensing of the working fluid 318 from one coil 320 to the next lower temperature coil 320 is a gradual process so that some condensation will probably be occurring in two of the coils 320 at the same time during the transition period. It is also to be understood that the heat input loop 301 will work as long as all of the coils $320_1$–$320_3$ are higher than the elevation $E_o$, coil $320_2$ is no higher than coil $320_1$ and coil $320_3$ is no higher than coil $320_2$.

In the heat recovery loop 302, heat is transferred to the driving fluid of the heat driven device HDD from the storage tanks ST by a combination recovery heat transfer link 410 whose theory of operation is also based on that of link 10. The loop 302 uses the lowest temperature tank first.

The recovery heat transfer link 410 has a plurality of input heat exchangers 415, one being associated with each storage tank ST. These input heat exchangers 415 have been numbered $415_1$, $415_2$ and $415_3$ to correspond to the numbering of tanks $ST_1$, $ST_2$ and $ST_3$ and are serially connected to each other. The heat exchangers 415 are coils with the coil 415, in tank $ST_1$ having fluid passage $424_1$ with inlet $421_1$ and outlet $422_1$. The outlet $422_1$ is located at elevation $E_{1o}$ which is the highest elevation of coil $415_1$. The coil $415_2$ in tank $ST_2$ has fluid passage $424_2$ with inlet $421_2$ and outlet $422_2$, the outlet $422_2$ being located at elevation $E_{2o}$, the highest elevation of coil $415_2$, and connected to the inlet $421_1$ of coil $415_1$ by transfer pipe 425. The coil $415_3$ in tank $ST_3$ has fluid passage $424_3$ with inlet $421_3$ and outlet $422_3$ which is located at elevation $E_{3o}$, the highest elevation of coil $415_3$. Outlet $422_3$ of coil $415_3$ is connected to inlet $421_2$ of coil $415_2$ by transfer pipe 426. The recovery loop 302 also includes a fluid receiver 428 defining a fluid chamber 429 therein with an upper inlet 430 and lower outlet 431. The outlet 431 is located at elevation $E_{Ro}$ higher than any of the elevations $E_{1o}$, $E_{2o}$ or $E_{3o}$ and is connected to the inlet $421_3$ of coil $415_3$ through metering valve 432 and inlet pipe 434. The inlet 430 has an elevation $E_{Ri}$ higher than elevation $E_{Ro}$. The output heat exchanger 420 is a coil which defines a passage 435 therethrough with inlet 436 and outlet 438. Outlet 438 has an elevation $E_o$ higher than the elevation $E_{Ri}$ of receiver 429 and is connected to the inlet 430 so that as vapor working fluid 418 in loop 302 condenses in coil 420, the condensed working fluid flows into the chamber 429 in receiver 428. The inlet 436 to coil 420 is located at elevation $E_i$ which is higher than elevation $E_o$ and is connected to the outlet $422_1$ of coil $415_1$ through vapor pipe 439. The coil 420 may be located in a duct D in a heating system so that air can be forced across coil 420 by fan F to heat the air while coiling coil 420.

The operation of the heat recovery loop 302 can best be described by starting with the working fluid 418 in its liquid phase in the fluid chamber 429 of receiver 428. The metering valve 432 is adjusted so that the liquid working fluid 418 is allowed to flow by gravity into the coil $415_3$. If the initial temperature $T_o$ of the working fluid 418 in receiver 428 is below the temperature $T_3$ in the storage tank $ST_3$, then the liquid working fluid 418 will be vaporized in coil $415_3$ thereby absorbing heat from the tank $ST_3$. This causes the vaporized working fluid 418 to flow out of coil $415_3$ through coil $415_2$ and coil $415_1$ and subsequently through the vapor pipe 439 to the output heat exchanger coil 420. If the temperature $T_a$ of the air flowing through the duct D is lower than the temperature $T_3$, then the vaporized working fluid 418 will be condensed in the coil 420 and the condensed working fluid will flow back into the receiver 428 under the influence of gravity. It will be noted that the vaporized working fluid 418 generated in the coil $415_3$ will absorb a small amount of heat to super heat the vapor as it flows through coil $415_2$ and will do likewise as the vapor working fluid 418 passes through coil $415_1$ since the temperature $T_2$ is higher than temperature $T_3$ and the temperature $T_1$ is higher than the temperature $T_2$. The quantity of heat absorbed from the storage tanks $ST_2$ and $ST_1$ as super heat, however, is small compared to the heat absorbed from the tank $ST_3$ because the heat absorbed by the working fluid 418 in coil $415_3$ is the latent heat of vaporization.

As heat is absorbed from the tank $ST_3$ by the working fluid 418, the temperature $T_3$ of the tank $ST_3$ continues to drop until such time as the available heat from the storage fluid in the tank $ST_3$ is not capable of vaporizing all of the liquid entering the coil $415_3$. At this time, the coil $415_3$ starts to fill with liquid working fluid 418 until some of this liquid working fluid overflows into the coil $415_2$ where it vaporizes at the higher temperature $T_2$ of tank $ST_2$. The vaporized working fluid continues to flow through the coil $415_1$ where it absorbs the small amount of additional heat as super heat as it passes through the coil $415_1$. The vapor working fluid 418 continues to flow to the coil 420 where it is condensed and flows by gravity back into the receiver 428. As indicated above, the temperature in the tank $ST_2$ will now start to drop and will reach a point where it can no longer vaporize all of the available liquid working fluid in the coil $415_2$. Consequently, the liquid working fluid 418 will start filling the coil $415_2$ and start to flow over into the coil $415_1$ where the higher temperature $T_1$ will vaporize the liquid working fluid 418. This process continues until the temperature $T_1$ in the tank $ST_1$ falls below the vaporizing temperature of the working fluid 418. Thus, it will be seen that the working fluid 418 will be vaporized in the first coil 415 it sees which is at a temperature higher than the vaporizing temperature of the working fluid 418. The heat recovery loop 302, then, uses the lowest useful temperature first. This type heat recovery is, in many cases, the most desirable since it is easier to replace the lowest temperature heat in the tanks ST by the solar collector SC, especially where the highest available temperature is not required in the coil 420 to drive the heat driven system associated therewith. On the other hand, reversal of the order of the coil 415 will cause the heat driving capability of the highest temperature storage tank ST to be depleted first.

THIRD EMBODIMENT OF HEAT RECOVERY SYSTEM

Figure 5:
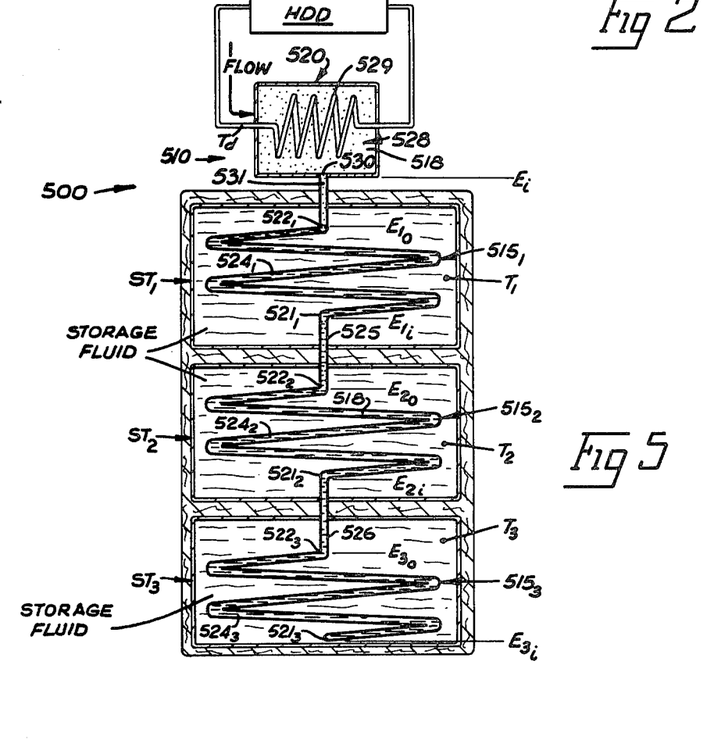

FIG. 5 illustrates an alternate embodiment of the heat recovery loop and is designated by the numeral 500. This loop uses a modified heat transfer link construction to recover heat from storage tanks ST at different temperature levels. The storage tanks ST act as the heat source for the system and the heat stored in the storage tanks ST is transferred to a heat driven device HDD such as a heater or heat driven air conditioner to drive the device. While different numbers of storage tanks ST may be used, three are illustrated and individually designated $ST_1$, $ST_2$ and $ST_3$. For the sake of clarity, the temperature $T_1$ of the tank $ST_1$ is higher than the temperature of $T_2$ of the tank $ST_2$ and the temperature $T_2$ of the tank $ST_2$ is higher than the temperature $T_3$ of the tank $ST_3$. The heat from the tanks ST is transferred to the driving fluid of the heat driven device HDD from the storage tanks ST by a combination recovery heat transfer link 510 whose theory of operation is based on that of link 10. The loop 500 removes heat from the highest temperature tank first.

The recovery heat transfer link 510 has a plurality of input heat exchangers 515, one being associated with each storage tank ST. These input heat exchangers have been numbered $515_1$, $515_2$ and $515_3$ to correspond to the number of tanks $ST_1$, $ST_2$ and $ST_3$. The heat exchangers $515_1$–$515_3$ are serially connected to each other as will become more apparent. The heat exchangers 515 are coils with the coil $515_1$ in tank $ST_1$ having fluid passage $524_1$ with lower end $521_1$ and upper end $522_1$. The upper end $522_1$ is located at elevation $E_{1o}$ and lower end $521_1$ is located at elevation $E_{1i}$ lower than elevation $E_{1o}$. The coil $515_2$ in tank $ST_2$ has fluid passage $524_2$ with lower end $521_2$ and upper end $522_2$, the upper end $522_2$ being located at elevation $E_{2o}$ at least as low as elevation $E_{1i}$ and the lower end $521_2$ being located at elevation $E_{2i}$ lower than elevation $E_{2o}$. The upper end $522_2$ is connected to the lower end $521_1$ of coil $515_1$ by transfer pipe 525. The coil $515_3$ in tank $ST_3$ has fluid passage $524_3$ with lower end $521_3$ and upper end $522_3$. Upper end $522_3$ is located at elevation $E_{3o}$ at least as low as elevation $E_{2i}$ and lower end $521_3$ is located at elevation $E_{3i}$ lower than elevation $E_{3o}$. Upper end $522_3$ of coil $515_3$ is connected to lower end $521_2$ of coil $515_2$ by transfer pipe 526 and lower end $521_3$ is closed. The recovery loop 500 also includes an output heat exchanger 520 through which the driving fluid of the heat driven device HDD passes to be heated. Output heat exchanger 520 is a shell and tube type heat exchanger where the vaporized working fluid 518 is received in the shell chamber 528 while the heat driven system driving fluid to be heated passes through the tube 529 of the exchanger 520. It will further be noted that the lowermost portion of the shell chamber 528 is located at elevation $E_i$ higher than the output elevation $E_{1o}$ of coil $515_1$. The inlet 530 to shell chamber 528 is located in the lowermost portion of chamber 528 and connected to the upper end $522_1$ of coil $515_1$ by pipe 531.

As mentioned above, the loop 500 recovers heat from the highest temperature available from tanks ST. This type recovery may be desirable in some cases such as in the operation of a device using an absorption refrigeration cycle where temperatures greater than about 180° F. are required.

In operation, the coils 515 are charged with working fluid 518 so that all of the coils 515 are filled to a level such that the liquid working fluid 518 fills at least a large portion of the upper coil $515_1$ when all of the heat storage tanks ST are at their maximum operating temperatures. Assuming that the temperature $T_1$ in tank $ST_1$ is higher than the temperature $T_2$ in the tank $ST_2$ and temperature $T_2$ is higher than the temperature $T_3$ in the tank $ST_3$, the equilibrium pressure and temperature in the working fluid 518 will be set by the temperature $T_1$ in the tank $ST_1$. This will cause the liquid working fluid 518 in coil $515_1$ to start being vaporized with heat being transferred into the vaporized working fluid 518 from the tank $ST_1$. Because the temperature $T_1$ in tank $ST_1$ sets the equilibrium pressure and temperature in the working fluid 518, the equilibrium temperature and pressure will be above that at which the working fluid 518 in coils $515_2$ and $515_3$ will be vaporized. Assuming that the temperature $T_d$ of the driving fluid passing through the tube 529 in the exchanger 520 is lower than the temperature $T_1$, heat will be transferred to the driving fluid to heat it while causing the vapor working fluid 518 in the coil 520 to be condensed whereupon it flows back down toward the coil $515_1$ under the influence of gravity for revaporization. The temperature $T_1$ in the tank $ST_1$ continues to drop as heat is taken from the tank and transferred to the driving fluid until the temperature $T_1$ substantially equals the temperature $T_2$ in the storage tank $ST_2$. At this point, the liquid working fluid 518 in the coil $515_2$ will start being vaporized and heat will now be transferred from both tanks $ST_1$ and $ST_2$ essentially equally since the evaporation of the working fluid 518 will take place all along the coil $515_1$ and $515_2$. A small temperature and pressure gradient will be established between the outlet $522_1$ of the coil $515_1$ and the inlet $521_2$ of the coil $515_2$ due to the effect of the weight of the column of liquid working fluid 518 on the equilibrium pressure of the working fluid. Heat will continue to be transferred from the tank $ST_1$ and $ST_2$ until their temperatures substantially equal the temperature $T_3$ whereupon evaportion will begin in the coil $515_3$ and continue in the coils $515_1$ and $515_2$. Heat will continue to be taken from all of the tanks ST so long as the temperatures in the tanks remain above the temperature of the driving fluid passing through the tubes 529 in the exchanger 520. The loop 500 will finally stop functioning when the temperature of the tanks ST reaches the temperature of the driving fluid passing into the tubes 529 of the exchanger 520. It will be noted that because the equilibrium pressures in the working fluid 518 are set by the highest temperature storage tank ST, the loop 500 will operate to always transfer heat from the highest temperature storage tank first, the next highest temperature storage tank next and finally the lowest temperature storage tank. The same result may be achieved if the coils $515_1$–$515_3$ are connected to output heat exchanger 520 in parallel.

The various embodiments of the heat storage loop and heat recovery loop have been described in specific configurations, however, it is to be understood that any one of the heat storage loops may be used with any one of the heat recovery loops. This is because there is no positive connection between the heat storage loops and the heat recovery loops.

While specific embodiments of the invention have been disclosed herein, it is to be understood that full use may be used of modifications, substitutions and equivalents without departing from the scope of the invented concept.

What is claimed as invention is:

1. A heat transfer system comprising:
   a heat source generating a heated output;
   a heat sink means for receiving heat including first and second heat storage means
   a working fluid having a prescribed vaporization temperature and pressure range;
   an input heat exchange means carrying the working fluid therein in a heat exchange relationship with said heat source to cause said heat source to vaporize said working fluid in said input heat exchange means, said input heat exchange means located at an input elevation; and
   an output heat exchange means operatively connected to said input heat exchange means for receiving vaporized working fluid from said input heat exchange means, and for returning condensed working fluid to said input heat exchange means, said output heat exchange means placing the vaporized working fluid in a heat exchange relationship with said heat sink means, and said output heat exchange means located at an output elevation higher than said input elevation so that the heat transferred to the working fluid in said input heat exchange means vaporizes the working fluid, the vaporized working fluid rises to said output heat exchange means, the heat in the vaporized working fluid is transferred to said heat sink means through said output heat exchange means as long as the temperature of said heat sink means is lower than the temperature of said heat source to cause the vaporized working fluid in said output heat exchange means to condense whereupon the condensed working fluid flows back to said input heat exchange means under the force of gravity for revaporization in said input heat exchange means, said output heat exchange means including a first output heat exchanger for receiving vaporized working fluid from said input heat exchange means and placing the vaporized working fluid in a heat exchange relationship with said first heat storage means, and a second output heat exchanger serially connected to said first output heat exchanger for receiving working fluid from said first output heat exchanger and placing the working fluid in a heat exchange relationship with said second heat storage means, said second output heat exchanger connected to said input heat exchange means so that condensed working fluid flows out of said first output heat exchanger to said second output heat exchanger and flows from said second output heat exchanger back to said input heat exchange means under the force of gravity for revaporization of said working fluid in said input heat exchange means.

2. The heat transfer system of claim 1 further including flow control means connecting said second output heat exchanger to said input heat exchange means for controlling the flow of condensed working fluid from said second output heat exchanger to said input heat exchange means.

3. The heat transfer system of claim 1 further including a heat driven system capable of receiving heat; and further including recovery output heat transfer means comprising a first recovery input heat exchanger placing the working fluid in a heat exchange relationship with said first heat storage means, a second recovery input heat exchanger serially connected to said first recovery input heat exchanger so that said first recovery input heat exchanger receives working fluid from said second recovery input heat exchanger, said second recovery input heat exchanger placing the working fluid in a heat exchange relationship with said second heat storage means, and recovery output heat exchange means connected to said first recovery input heat exchanger and said second recovery input heat exchanger so that condensed working fluid flows out of said recovery heat exchange means to said second recovery input heat exchanger and flows through said second recovery input heat exchanger to said first recovery input heat exchanger under the force of gravity for vaporization of said working fluid in said second and first input heat exchangers.

4. The heat transfer system of claim 3 wherein said recovery heat transfer means further includes recovery flow control means connecting said recovery output heat exchange means to said second recovery input heat exchanger for controlling the flow of condensed working fluid from said recovery output heat exchange means to said second recovery input heat exchanger.

5. The heat transfer system of claim 4 wherein said recovery heat transfer means further includes recovery liquid receiver means connecting said recovery output heat exchange means to said recovery flow control means.

6. The heat transfer system of claim 2 further including liquid receiver means connecting said output heat exchange means to said flow control means.

7. A heat transfer system comprising:
   a heat source generating a heated output;
   first heat storage means capable of storing heat;
   second heat storage means capable of storing heat;
   storage heat transfer link means operatively connecting the heat source to said first and second heat storage means to selectively transfer the heat generated by said heat source to said first and second heat storage means, said storage heat transfer link means comprising:
      a first storage working fluid having a prescribed vaporizing temperature and pressure range;
      an input heat exchanger carrying the storage working fluid therein in a heat exchange relationship with the heated output from said heat source to cause said heat source to selectively vaporize said storage working fluid in said input heat exchanger, said input heat exchanger located at an input elevation;

a first output heat exchanger having a first inlet and a first output, said first inlet operatively connected to said input heat exchanger for receiving vaporized storage working fluid from said input heat exchanger and placing the vaporized storage working fluid in a heat exchange relationship with said first heat storage means, said first inlet of said first output heat exchanger located at a first inlet elevation higher than said input elevation and said first outlet of said first output heat exchanger located at a first outlet elevation lower than said first inlet elevation and higher than said input elevation so that when heat is transferred to the storage working fluid from said heat source to vaporize the storage working fluid in said input heat exchanger, the vaporized storage working fluid flows into said first output heat exchanger and heat in the vaporized storage working fluid is transferred to said first heat storage means through said first output heat exchanger as long as the temperature of said first heat storage means is lower than the temperature of said heat source to cause the vaporized storage working fluid in said first output heat exchanger to condense whereupon the condensed first storage working fluid flows out through said first outlet of said first output heat exchanger under the force of gravity; and a second output heat exchanger having a second inlet and a second outlet, said second inlet operatively connected to said first outlet of said first output heat exchanger for receiving storage working fluid from said first outlet of said first output heat exchanger, said second output heat exchanger placing the storage working fluid from said first output heat exchanger in a heat exchange relationship with said second heat storage means, said second inlet of said second output heat exchanger located at a second inlet elevation higher than said input elevation and at least as low as said first outlet elevation of said first output heat exchanger, said second outlet of said second output heat exchanger located at a second outlet elevation lower than said second inlet elevation and higher than said input elevation, said second outlet connected to said input heat exchanger to return the storage working fluid condensed in said first and second output heat exchangers to said input heat exchanger under the force of gravity for revaporization so that the heat transferred to the storage working fluid in said input heat exchanger vaporizes the storage working fluid, the vaporized storage working fluid flows to said first output heat exchanger, heat in the vaporized storage working fluid is transferred to said first heat storage means through said first output heat exchanger as long as the temperature of said first heat storage means is lower than the temperature of said heat source to cause condensation of said vaporized storage working fluid in said first output heat exchanger whereupon the condensed storage fluid flows through said second output heat exchanger and back to said input heat exchanger for revaporization, and so that any vaporized storage working fluid flowing into said second output heat exchanger through said first output heat exchanger has heat transferred to said second heat storage means through said second output heat exchanger as long as the vaporized storage working fluid is received in said second output heat exchanger and the temperature of said second heat storage means is lower than the temperature of said heat source to cause the vaporized storage working fluid in said second output heat exchanger to condense whereupon the condensed storage working fluid flows back to said input heat exchanger under the force of gravity for revaporization in said input heat exchanger.

* * * * *